Aug. 6, 1968   E. H. BECK   3,396,068
LEATHER JOINTING
Filed Nov. 20, 1964   4 Sheets-Sheet 1
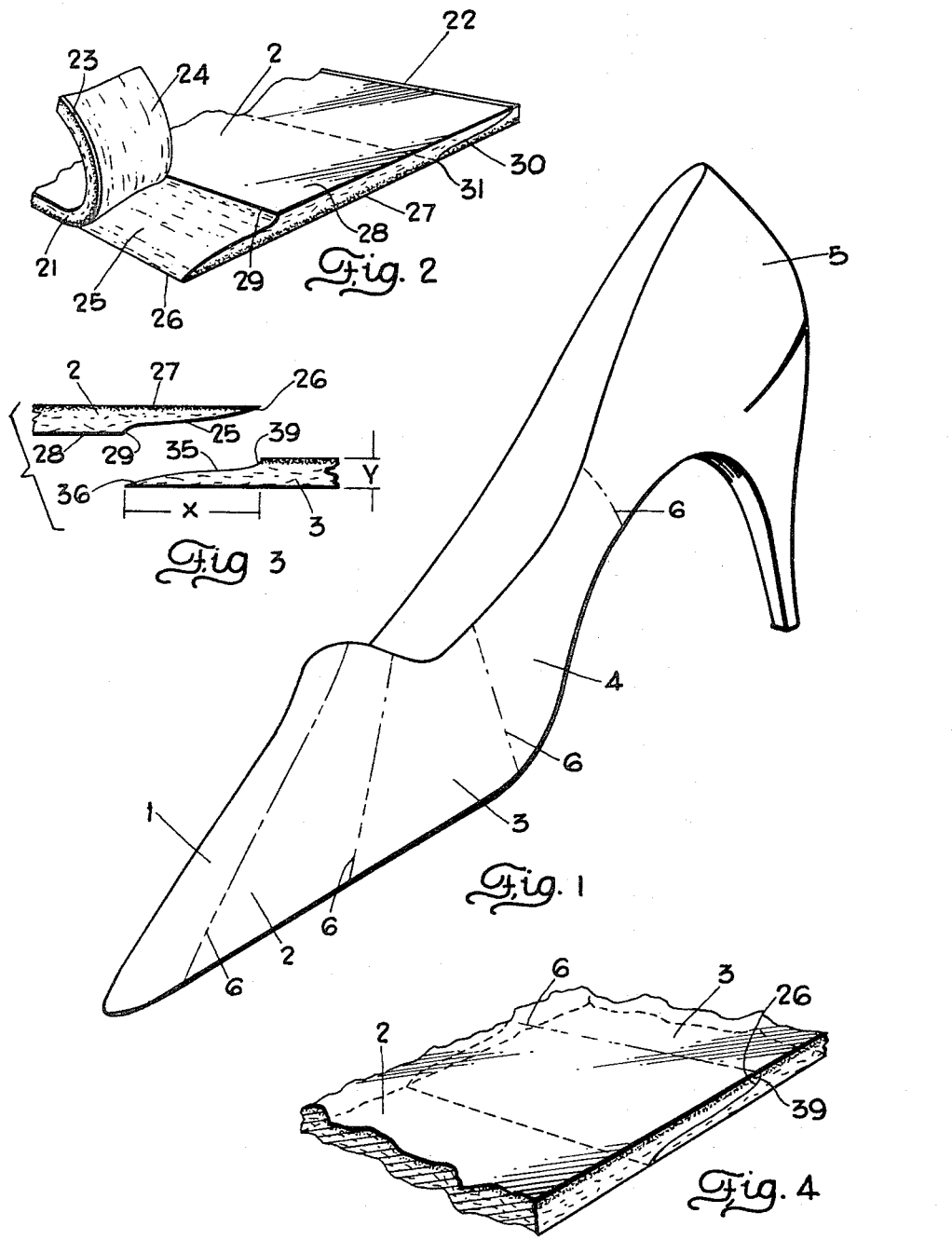
Inventor
Edwin H. Beck
By his Attorney Aug. 6, 1968  E. H. BECK  3,396,068
LEATHER JOINTING
Filed Nov. 20, 1964  4 Sheets-Sheet 3
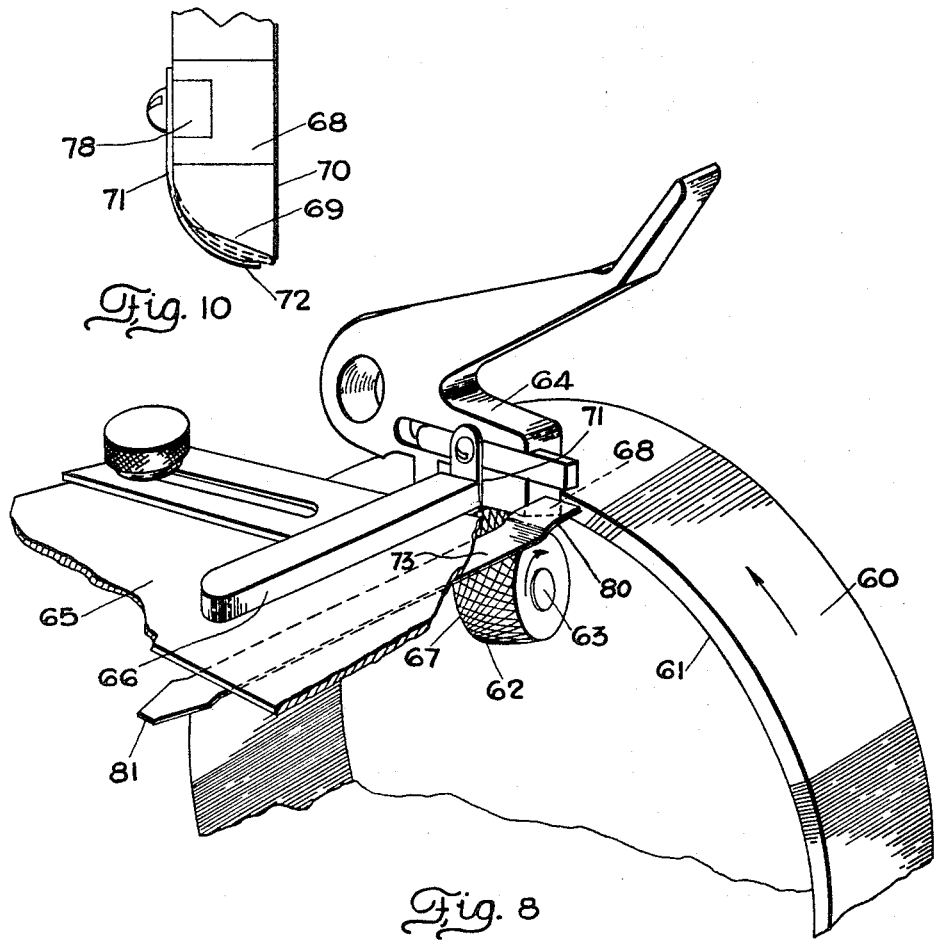
Fig. 10
Fig. 8
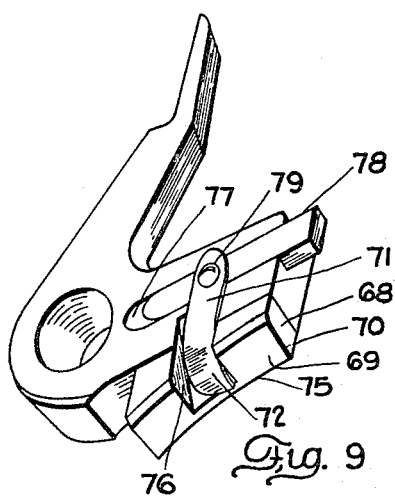
Fig. 9

Aug. 6, 1968        E. H. BECK        3,396,068

LEATHER JOINTING

Filed Nov. 20, 1964        4 Sheets-Sheet 4

United States Patent Office 3,396,068
Patented Aug. 6, 1968

3,396,068
LEATHER JOINTING
Edwin H. Beck, Lemay, Mo., assignor to Manufacturers Supplies Company, St. Louis, Mo., a corporation of Missouri
Filed Nov. 20, 1964, Ser. No. 412,754
15 Claims. (Cl. 161—38)

This invention relates generally to the manufacture of leather articles, such as shoes, purses and the like, and particularly to the jointing of pieces of leather and leather-like material so that the joints in conspicuous parts of such articles are macroscopically insensible at reasonable distances, and practically insensible to the touch.

The jointing of leather pieces in the fabrication of articles made thereof familiarly takes the form of overlap joints which may be stitched or cemented, but heretofore such joints have necessarily been of a character which detracted from the appearance of the article, at least when the joints appeared at conspicuous surfaces of the article. In the manufacture of articles from fine leather, efforts are made by the craftsman to avoid the occurrence of joints at conspicuous areas because of the unsightliness and the derogation of quality inherent in the appearance of such joints. In their efforts to avoid the occurrence of joints at positions where their presence would detract from the appearance of the article and the value to be attached to it, craftsmen have been compelled to make use of large pieces of leather and to discard much scrap because of the apparent impossibility of joining small pieces without detracting from the appearance and quality of the finished product.

It is the object of the present invention therefore to provide a method of joining swatches of leather so that the existence of the joint is, in a practical sense, imperceptible either to the eye or to the touch; and it is a further object of the invention to provide apparatus for scarfing swatches of leather and leather-like material to be joined as aforesaid.

In general, the invention contemplates that a leather article, such as a shoe, have its most conspicuous areas formed of swatches of the desired leather or leather-like material, said swatches being joined together by a scarf-lap-joint of a character such as to be macroscopically invisible from a reasonable distance, and as to be practically insensible to the touch. The invention contemplates, however, the jointing of swatches of leather-like material which so contrast in color, grain, or texture, as to make conspicuous the line of demarcation between them, but nevertheless have the joint between them practically insensible to the touch so as to create the illusion of a multi-colored or multi-textured hide. More specifically, the invention contemplates so contouring a scarf-lap-joint that, on the side which is normally exposed to view (i.e., usually the grain side of leather), the joint is not readily discernible while the article is in normal use. To accomplish this, the contour (as viewed edgewise) of the scarf, in the swatch of leather which provides the underlay for the joint, is a reverse curve. Preferably, the curvature (so viewed) of the underlay scarf is such as to provide a concavity adjacent the intersection of the scarf with the obverse surface of the leather, and to provide a convexity adjacent the intersection of the scarf with the reverse side of the leather, yet providing a gradual non-reentrant slope between the obverse and reverse surfaces. As used herein, the expression "obverse surface" means the surface of a piece of leather or leather-like material which is normally exposed to view from the exterior of a finished article, and is ordinarily the grain side of leather. As used herein, the expression "reverse surface" is intended to mean the surface of a piece of leather or leather-like material which, in the finished article, is ordinarily on the inside, or at least concealed from view during use, which, in the case of leather, would ordinarily be the flesh side.

Having provided such a scarf on the swatch of material which is to provide the underlap of the joint, a comparable scarf, in reverse orientation, is made in the swatch of material which is to constitute the overlap of the joint. While the scarves in the overlap and underlap may, if desired, be contrageneric, it is preferable, at least for rapid production, that they not be exactly so. However, the formation of such scarves with the modified form of conventional bell-knife skiver hereinafter described usually provides the desired disparity between the contour of the scarf on the underlap and the overlap, respectively, by virtue of the difference in effect resulting from feeding the one swatch to the machine in upside-down relationship to that in which the other swatch is fed.

Thus, the character of the scarf in the underlap is such as to provide a more or less escarped shoulder adjacent the obverse surface. In the case of deeply-grained leather, as, for example, reptile skins, said shoulder preferably extends for at least the depth of the grain, i.e., the distance thickness-wise of the leather between the highest peak and the lowest valley in the grain at the escarped shoulder. On the other hand, it is preferable that the scarf in the overlap terminate in an edge which is more feathered than it would be if truly contrageneric with said escarped shoulder.

Having scarfed the respective swatches of material to be joined in the manner described, they are cemented together with the feathered edge of the overlap overlying and concealing the shoulder in the underlap. The nature of the scarf-lap-joint, contoured as hereinabove described, is such that it is not prohibitively painstaking (ergo, not economically unfeasable) to bring the feathered edge of the overlap into the desired concealing relationship with the shoulder on the underlap. The process of cementing is expedited by the use of a leather cement of a character which permits scarves coated with it to be readily maneuvered into the desired co-relationship and, once properly related, pressed together to permanently secure the parts together without ooze or splatter of the adhesive.

The joint, the article embodying the joint, and suitable apparatus for conveniently and expeditiously scarfing the material in accordance with the present invention, are illustrated in the accompanying drawings, in which:

FIGURE 1 is a perspective view of a shoe whose upper is formed of a plurality of swatches joined in accordance with the present invention;

FIGURE 2 is a perspective view of a swatch of leather in the process of being skived in accordance with the present invention;

FIGURE 3 is a view in side elevation of two swatches of leather skived in accordance with the present invention, one to provide the underlap, the other to provide the overlap, of a scarf-lap-joint;

FIGURE 4 is a perspective view of the joint formed by the underlap and overlap shown in FIGURE 3;

FIGURE 8 is a perspective view of the knife, the feed roll, the presser foot and edge guide, of a typical bell knife skiving machine so modified and equipped as to produce scarves having the contour required to produce the scarf-lap-joint of the present invention;

FIGURE 9 is a perspective view of the form of presser foot preferred for use in a skiving machine to produce scarves required by the present invention;

FIGURE 10 is a toe-end view of the presser foot shown in FIGURE 9;

Figure 11:
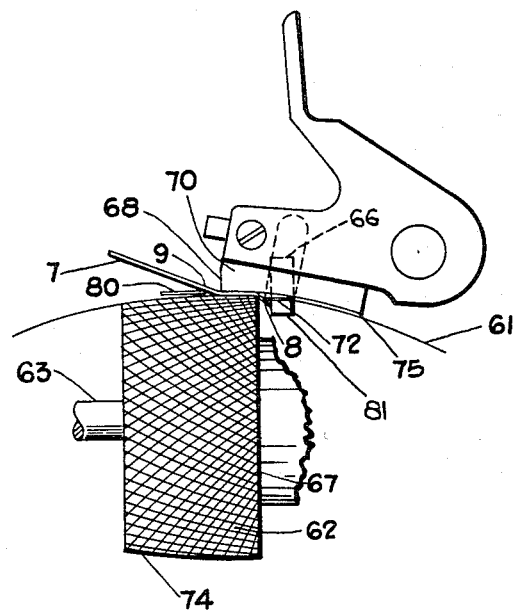
Figure 12:
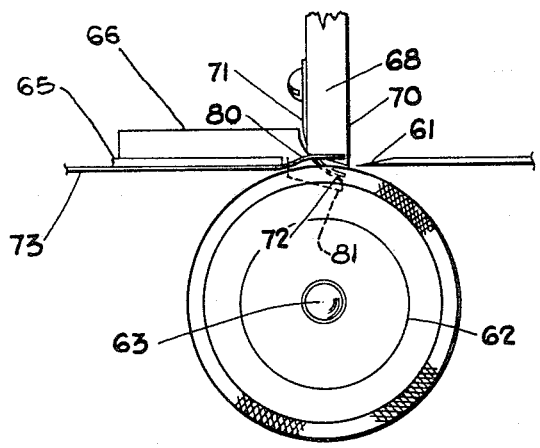

FIGURE 11 is a view in elevation, as seen from the edge of the knife in the skiving machine, showing the relationship between the leather being skived, the presser foot, the feed roll and adjunct devices to conform the leather to the contour which results in a scarf having the aforesaid contour; and FIGURE 12 is a diagrammatic elevation, viewed along the axis of the feed roll shaft toward the toe of the presser foot, of the structure shown in FIGURE 11, but excluding the leather being skived.

The shoe shown in FIGURE 1 of the drawings is illustrative of a leathern article constructed in accordance with the present invention, wherein part or all of the outside surface is a composite of a plurality of swatches of leather-like material with substantially imperceptible joints between them. The most conspicuous part of a shoe is the vamp, and in the shoe illustrated in FIGURE 1, the near side of the vamp includes segments 1, 2, 3 and 4, segments 1 and 2 being joined together by scarf joints of the character hereinbefore indicated and later to be described in detail. Likewise, segment 2 is so joined to segment 3, and segment 3 is so joined to segment 4. Moreover, segment 4 of the vamp is so joined to a quarter section 5 of the upper, and the invention further contemplates that inside and outside quarter sections be likewise joined together to form a substantially imperceptible back seam. In the form shown in FIGURE 1, the several segments of the vamp may be made from small matching swatches of fine leather, so that the lines of demarcation between them are practically imperceptible; or, if desired, each of the segments may be of a different color, so that the line of demarcation between them is apparent by the contrasting colors, but the entire vamp has the feel of one piece of leather so as to create the illusion that it was made from a striped skin. For example, several calf skins may be dyed different colors, swatches cut from each, and joined in accordance with the present invention so as to match the grain, but create the illusion of a variegated skin.

While lines of demarcation 6 are shown between the respective segments of the shoe vamp, it will be understood that these are merely to designate the location of the joint between those segments, and, as previously indicated, in the finished product the joint is intended to be practically imperceptible. While all the joints at 6 are alike, the joint between segments 2 and 3 will now be described in detail by reference to FIGURES 2, 3 and 4.

Referring now to FIGURE 2, there is shown a swatch of leather from which segment 2 of the shoe vamp is to be formed. The swatch is cut according to a predetermined pattern to provide converging edges 21 and 22 which are shown as rectilinear, but are not necessarily so in practice. The opposite edges 21 and 22 converge toward each other merely because the segment 2 is wedge-shaped in the ultimate product, and consequently it is to be understood that the invention is not limited to the use of swatches of leather wherein the margins converge. As shown in FIGURE 2, the swatch is a mite wider between edges 21 and 22 than will be the ultimately scarfed segment. The difference in width is a matter of convenience in making the scarves with the apparatus hereinafter described, and is represented in FIGURE 2 by a residual stripe of grain 23, about a sixteenth of an inch in width, which is integral with the scrap strip 24 resulting from the skiving operation. For convenience in the operation with the apparatus hereinafter described, it is desirable to have at least about a thirty-second of an inch of the surface increments so removed in the scarfing operation, but the amount so removed in excess of a thirty-second of an inch is a matter of choice. Having skived off the scrap 24, an overlay scarf 25 is formed on the swatch 2. The scarf 25 comes to a thin edge 26, where it intersects the grain side 27 of the swatch; and where it intersects the flesh side 28 of the swatch, the scarf forms a shoulder 29. Edge 22 is reversely scarfed in like manner to provide an underlay scarf 30, whose shoulder 31, comparable to 29, is at the intersection of the scarf with the grain side 27.

Similarly, another swatch is scarfed to provide segment 3 which, as shown in FIGURE 3, has an underlay scarf 35 with a shoulder 39 at the intersection of the scarf with the grain side, and a feather 36 at the intersection of the scarf 35 with the flesh side. From FIGURE 3, it will be apparent that the contour of the scarves is a non-reentrant reverse curve gradually sloping from its intersection with the grain side to its intersection with the flesh side, which intersections are a substantial distance away from each other, represented by the distance X in FIGURE 3. The distance X is at least twice the thickness (represented by the distance Y in FIGURE 3) of the swatch, and preferably substantially more than twice as shown, so as to provide a relatively long bevel intermediate the reversely curving portions at the shoulders 29 and 39 and at the feathers 26 and 36.

Having thus provided two swatches with scarves 25 and 35, each scarf is coated with an appropriate adhesive and brought together as shown in FIGURE 4, so that the feather 26 conceals shoulder 39, and the respective swatches are secured together by adhesive along the scarves 25 and 35, while the irregularities in the grain of the respective swatches are substantially matched at line 6.

As will be explained hereinafter, the scarves 25 and 35 can be, and preferably are, made on a bell knife skiving machine, modified and equipped as hereinafter to be described, but with the same setting for scarves that are to be joined together. For example, the overlay swatch 2 may be run through the skiving machine with its flesh side up, while the underlay swatch 3, may be run through the skiving machine with its grain side up.

Figure 6:
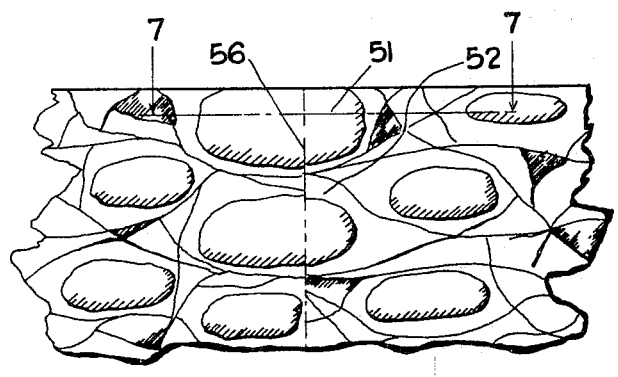
FIGURE 6 is a plan view of the obverse surface resulting from the joinder of the swatches shown in FIGURE 5.

The contour of the joint shown in FIGURES 3 and 4 is appropriate for fine-garined leathers, such as calf, kid and patent, with or without backing, but in the case of deep-grained leathers, such as alligator (natural, simulated, or synthetic) and other reptile skins, it is preferable to accentuate the escarptitude of the shoulder at the intersection of the scarf with the grain side of the leather, as will now be described with reference to FIGURES 5, 6 and 7.

Figure 5:
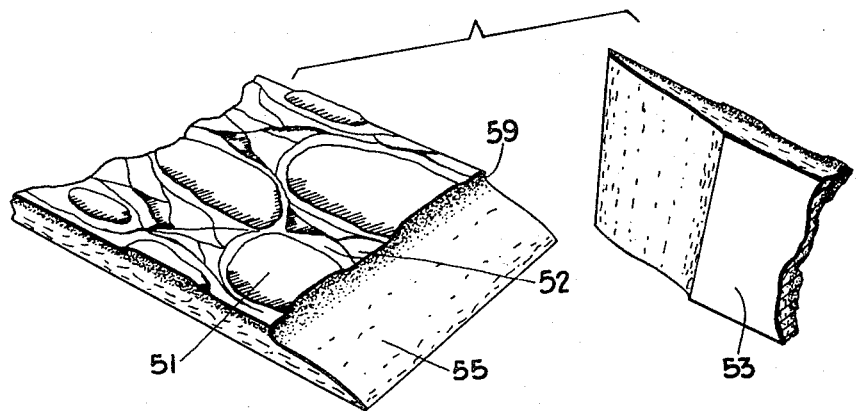
FIGURE 5 is an exploded view of two swatches of deep-grained leather scarfed in accordance with the present invention, so as to provide an underlap and an overlap of a scarf-lap-joint.
Figure 7:
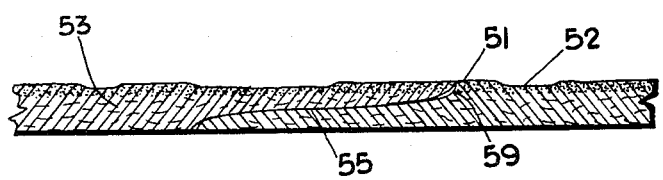
FIGURE 7 is a sectional view taken along line 7—7 of FIGURE 6.

It will be observed from FIGURES 5 and 7 that the shoulder 59 extends substantially normal to the surface of the leather for a depth at least about a thousandth of an inch greater than the depth of the grain, i.e., the distance between the highest peak 51 and the lowest valley 52 to be intersected by the scarf 55. Otherwise, the obliquity of the cut at the intersection 56 of the scarf with the grain surface will result in a ragged, rather than a regular line (as viewed in a direction normal to the grain side of the leather) and, when joined with the overlay 53, the location of the joint will be more discernible.

Regardless of the character of leather or leather-like material employed, or the depth of its grain, the contour of the scarf, such as 35, or 55, on the underlap is a reverse curve, wherein adjacent the intersection of the scarf with the grain side, or other obverse surface of the material, the slope is such that for a depth substantially less than half the thickness (Y) of the leather, the increments ($d$) of X are less than the increments ($d$) of Y; but in the case of deep-grained leather, the increments ($dX$) of X, equal or approach zero, at least for the depth of the grain. For the major part of the distance X, however, the slope of the curve is such that increments ($dX$) of X are greater than increments ($dY$) of Y. As clearly shown in FIGURE 7, the scarf on the overlap is substantially contrageneric with the scarf on the underlap at the grain side.

Scarves of the character aforesaid can be made with facility upon a conventional bell knife skiver so modified as to cause the swatch being skived to be biased downwardly about the end of the active surface of the feed roll, and also biased upwardly about the toe end of the presser foot. That is to say, the leather being skived is delivered to the rotating knife edge immediately upon being released from confinement wherein it was reversely curved in greater degree but in the same fashion as the curvature of the scarf desired. To accomplish this result, a conventional bell knife skiving machine, having rotating knife 60, with a circular edge 61 driven in rotation, in the direction indicated by the arrow thereon in FIGURE 8, about the center of the circular knife edge, is provided, in accordance with the usual practice, with a feed roll 62 driven in rotation on a shaft 63 in the direction indicated by the arrow thereon (FIGURE 8) about an axis which extends normal to the direction of the axis of rotation of the knife 60. Such a machine is conventionally equipped with a presser foot for biasing the leather or leather-like material downwardly against the zenith of the feed roll in order that the feed roll may grip it and advance the leather toward, against, and over knife edge 61. Such a presser foot, as modified in accordance with the present invention, is shown at 64. Enclosing the knife (except for increments proximate the zenith thereof), as well as the feed roll (except for increments proximate the zenith thereof), is a casing including a top plate 65, on which is adjustably mounted an edge guide 66.

The modifications in the conventional bell knife skiver necessary to enable it to produce the type of screw required for the present invention fall into the following categories:

(a) The feed roll is bobbed at its great circle so that the maximum diameter of the feed roll is at one end 67, and is aligned approximately with the zenith radius of the rotating knife edge, as shown in FIGURE 11, thereby providing an abrupt shoulder over which the swatch of leather 7 being skived can be bent downwardly, as shown at 8.

(b) The presser foot is modified in two particulars.

First, the toe end 68 thereof makes a distinct angle (as contrasted with conventional rounding) with the bottom surface 69 thereof; and the bottom surface 69 makes an acute angle with the back surface 70 thereof. Thus, the three surfaces 68, 69 and 70 merge into a sharp (as distinguished from rounded) point about which a swatch being skived may be bent upwardly (i.e., away from the feed roll) as shown at 9 in FIGURE 11. Secondly, the pressure foot is provided with a spring finger 71, the free end 72 of which (when unstrained) projects below the edge formed by the intersection of surfaces 69 and 70, as shown clearly in FIGURE 10, for the purpose of biasing the swatch 7 over the end of the feed roll in order to create the curve as shown at 8 in FIGURE 11. However, during the skiving operation, the spring finger 71 yields so that the free end 72 approaches said intersection (as shown in dotted lines in FIGURE 10), but does not extend beyond the plane of surface 70 where it might foul against the knife edge.

(c) The top plate 65 is modified on its under-surface to adjustably accommodate a spring finger 73, which extends above the feed roll in closely spaced relationship to the toe end 68, and thus tends to bias leather passing over it upwardly about the toe end of the presser foot to create the curve shown at 9. This modification is not indispensable, as a skilled operator can manually bias the leather being skived upwardly about the toe end of the presser foot without the aid of spring finger 73.

(d) The edge guide 66 has a tongue 81 which projects beneath the presser foot so as to continue to guide the edge of the swatch being skived as it is biased downwardly by spring finger 71. This modification is not indispensable, as a skilled operator may, by exerting the proper pull on the swatch to prevent its tendency to follow the knife edge's direction of rotation, maintain the proper alignment. The curvature on the upper side of tongue 81 is similar to that of spring 72, and while they do not necessarily touch, it is preferable that the tongue 81 does not substantially flex spring finger 71.

As is conventional in such machines, the feed roll 62 is provided with a knurled surface circular in cross-section, but of diminishing diameter from its great circle toward its smaller end. The rate of diminution of the diameter is such as to make the radius of curvature 74 in the axial direction substantially the same as the radius of curvature of knife edge 61. The axis of shaft 63 is so disposed that, at its zenith, feed roller radius 74 is parallel with, and spaced from, the orbit of the knife edge 61 a distance less than the thickness of the leather being skived.

The line along which the bottom surface 69 of the presser foot intersects the back surface 70 thereof is likewise curved on a radius substantially the same as the radius of the knife edge, as shown at 75 in FIGURE 9, and preferably the bottom surface of the presser foot between the toe end and spring 71 is provided with a hardened material such as an inlay of tungsten carbide.

The presser foot is further provided with a depression 76, within which spring finger 71 is accommodated at the side thereof remote from knife 61; and in the embodiment shown in the drawings, the presser foot is provided with a groove 77 extending horizontally and accommodating a slide bar 78 upon which spring finger 71 is replaceably mounted by screw 79. To secure the slide bar 78 against movement within groove 77 (except when it is undergoing adjustment), any suitable means may be employed as, for example, a clamping screw extending through the back side of the presser foot. Thus the arrangement provides for adjustment of spring finger 71 toward and away from toe end 68 of the presser foot within the limits of the width of depression 76, thereby to vary the slope of the scarf at its feather end according to the rule that the closer spring end 72 is to the end of feed roll 62, the steeper will be the feather.

The spring finger 73 has its terminal portion (nearest knife edge 61) bent upwardly at 80, as shown in FIGURES 8 and 12, and is accommodated in a raceway in the lower surface of top plate 65 so that finger 73 may be adjusted both toward and away from knife edge 61, and toward and away from toe end 68 of the presser foot, in order to accommodate material of differing thickness and physical properties. The other terminal end (i.e., remote from knife edge 61) of spring finger 73 projects beyond top plate 65 in order to provide an accessible portion 81 for manipulation of the spring finger in accomplishing the desired adjustment.

From the foregoing description, it should be apparent that the invention accomplishes its objects, and provides a joint for leather and leather-like materials, as well as a method and apparatus for making such a joint, whereby separate swatches of leather and leather-like material may be joined inconspicuously so as to produce a composite jointed article made of multiple pieces, but either having the appearance and effect of a single skin; or having individual contrast one with the other so as to give the visual effect of a striped or variegated single skin. Thus, by the use of the joint of the present invention, and the method and apparatus disclosed, it is possible to fabricate valuable articles from swatches of the highest grade of leather which would otherwise be scrapped, and to do so with great efficiency, economy and facility.

While the joint, the method of making it, and the apparatus for preparing the leather swatches, have each been herein disclosed in the form which is believed to be best for the most general application, it is realized that the joint, the method and the apparatus are each susceptible of numerous modifications and variations which will not depart from the principles of the invention as hereinbefore described, and consequently it is to be distinctly understood that the invention is not limited to the details of the joint, the method, or the apparatus specifically disclosed herein for the purpose of illustrating the best form of the invention.

Having thus described the invention, what is claimed and desired to be secured by Letters Patent is:

1. An article composed of a plurality of pieces of leather-like material united together in a scarf-lap-joint, said scarf-lap-joint being characterized by the feature that the piece of said material having the underlap portion of said scarf-lap-joint has
   (a) a shoulder adjacent the intersection of the scarf with the obverse surface of the underlap, said shoulder being curvilinear (as viewed edgewise),
   (b) a feather adjacent the intersection of the scarf with the reverse surface of the underlap,
   (c) a bevel extending for a substantial distance between said shoulder and said feather,
   (d) the slope of said curvilinear shoulder being substantially steeper than the slope of said bevel,
and the piece of said material having the overlap portion of said scarf-lap-joint has
   (e) a feather adjacent the intersection of the scarf with the obverse surface of the overlap, said feather being curvilinear (as viewed edgewise),
   (f) a bevel substantially corresponding in slope and length to the bevel on the underlap,
   (g) the slope of said curvilinear feather (e) being substantially steeper than the slope of said bevel (f).

2. The article of claim 1 wherein the shoulder (a) and the feather (e) are substantially contrageneric.

3. The article of claim 1 wherein the bevel (c) is substantially tangent with the shoulder (a) at the end of the shoulder most remote from the obverse surface of the piece of said material having the underlap portion; and wherein the bevel (f) is substantially tangent with the feather (e) at the end of said feather most remote from the obverse surface of the piece of material having the overlap portion.

4. The article of claim 3 wherein the shoulder (a) and the feather (e) are substantially contrageneric.

5. In a joint between leather-like swatches having grain on one side of each swatch, each swatch having a scarfed edge, and the respective scarfed edges lapping each other with the grain side of each swatch addressed in the same direction, the scarf on one swatch being thinned toward its grain side, the scarf on a second swatch being thickened toward its grain side, the improvement which comprises: the contour of the scarf on said one swatch (as viewed in a plane normal to the intersection of said scarf with the grain side) being a non-reentrant curve defining:
   (a) a convexity adjacent the grain side, and
   (b) a more gradual slope intersecting said convexity at the end thereof most remote from the grain side,
and the contour of the scarf on said second swatch being a non-reentrant curve defining:
   (c) a concavity adjacent the grain side, and
   (d) a more gradual slope intersecting said concavity at the end thereof most remote from the grain side.

6. The joint of claim 5 wherein said convexity (a) and said concavity (c) are substantially contrageneric.

7. The joint of claim 5 wherein the more gradual slope (b) is substantially tangent with the convexity (a) at the end of the convexity most remote from the grain side of said one swatch; and wherein the more gradual slope (d) is substantially tangent with the concavity (c) at the end of said concavity most remote from the grain side of said second swatch.

8. The joint of claim 7 wherein the convexity (a) and the concavity (c) are substantially contrageneric.

9. In a joint between leather-like swatches having grain on one side of each swatch, each swatch having a scarfed edge whose length (X) is more than twice the thickness (Y) of the swatch, and the respective scarfed edges lapping each other with the grain side of each swatch addressed in the same direction, the scarf on one swatch being thinned toward its grain side, the scarf on a second swatch being thickened toward its grain side, the improvement which comprises: the contour of the scarf on each swatch (as viewed in a plane normal to the intersection of said scarf with the grain side) having:
   (a) a relatively long bevel located below the grain, said bevel having a slope wherein $dX$ is substantially greater than $dY$,
   (b) a curved escarpment at the grain side and extending into the swatch for a depth at least equal to the thickness of the grain, said curved escarpments each having a slope $dY/dX$ which is substantially greater than that of said bevel.

10. The joint of claim 9 wherein the curved escarpments (b) in the respective swatches are substantially contrageneric.

11. The joint of claim 9 wherein the bevels (a) on the respective swatches have substantially the same slope.

12. The joint of claim 11 wherein the curved ascarpments (b) in the respective swatches are substantially contrageneric and each escarpment is substantially tangent with the bevel in the same swatch.

13. An article composed of a plurality of pieces of leather-like material cemented together in a scarf-lap-joint, said scarf-lap-joint being characterized by the feature that the piece of said material having the underlap portion of said scarf-lap-joint has
   (a) a shoulder adjacent the intersection of the scarf with the obverse surface of the underlap,
   (b) a feather adjacent the intersection of the scarf with the reverse surface of the underlap,
   (c) a bevel extending for a substantial distance between said shoulder and said feather,
   (d) the slopes of said shoulder and of said feather being substantially steeper than the slope of said bevel,
and the piece of said material having the overlap portion of said scarf-lap-joint has
   (e) a shoulder adjacent the intersection of the scarf with the reverse surface of the overlap,
   (f) a feather adjacent the intersection of the scarf with the obverse surface of the overlap, and
   (g) a bevel substantially corresponding in slope and length to the bevel on the underlap.

14. In a joint between leather swatches having substantially similar grain on one side of each swatch, each swatch having a scarfed edge, and the respective scarfed edges lapping each other with the grain side of each swatch addressed in the same direction, the scarf on one swatch being thinned toward its grain side, the scarf on a second swatch being thinned toward its flesh side, the improvement which comprises: the contour of the scarf on said second swatch (as viewed in a plane normal to the intersection of said scarf with the grain side) being a non-reentrant reverse curve defining:
   (a) a convexity adjacent the side of the swatch toward which the scarf is thinned,
   (b) a concavity adjacent the side of the swatch opposite that toward which the scarf is thinned, and
   (c) a gradual non-re-entrant slope between said convexity and said concavity.

15. In a joint between leather-like swatches having substantially similar grain on one side of each swatch, each swatch having a scarfed edge, and the respective scarfed edges lapping each other with the grain side of each swatch addressed in the same direction, the scarf on one swatch being thinned toward its grain side, the scarf on a second swatch being thinned toward its flesh side, the improvement which comprises: the contour of the scarf on said second swatch (as viewed in a plane normal to the intersection of said scarf with the grain side) being a non-reentrant reverse curve wherein the length (X) of the scarf is more than twice the thickness (Y) of a swatch, and each scarf has a relatively long bevel intermediate two reversely curving portions, said intermediate bevel having a slope wherein $dX$ is substantially greater than $dY$, and said reversely curving portions each having a slope $dY/dX$ which is substantially greater than that of said intermediate bevel.

References Cited

UNITED STATES PATENTS

| | | | |
|---|---|---|---|
| 946,844 | 1/1910 | Keats | 69—9.5 |
| 1,079,462 | 11/1913 | Alexander | 69—9.5 |
| 1,117,541 | 11/1914 | Alexander | 69—9.5 |
| 1,210,082 | 12/1916 | Klager | 69—9.5 |
| 1,698,641 | 1/1929 | Lyon | 69—21.5 X |
| 2,166,960 | 7/1939 | Lyon | 69—21.5 X |
| 3,043,126 | 7/1962 | Beck | 69—9.5 |
| 3,133,434 | 5/1964 | Beck | 69—9.5 |

JORDAN FRANKLIN, *Primary Examiner.*

A. R. GUEST, *Assistant Examiner.*

UNITED STATES PATENT OFFICE
CERTIFICATE OF CORRECTION

Patent No. 3,396,068                             August 6, 1968

Edwin H. Beck

It is certified that error appears in the above identified patent and that said Letters Patent are hereby corrected as shown below:

Column 1, lines 10 and 41, "leather", each occurrence, should read -- leathern --. Column 5, line 33, "screw" should read -- scarf --; line 52, "pressure" should read -- presser --. Column 8, line 23, "ascarp-" should read -- escarp- --.

Signed and sealed this 20th day of January 1970.

(SEAL)
Attest:

Edward M. Fletcher, Jr.                          WILLIAM E. SCHUYLER, JR.
Attesting Officer                                           Commissioner of Patents